(12) United States Patent
Shirai

(10) Patent No.: US 7,675,214 B2
(45) Date of Patent: Mar. 9, 2010

(54) LOW PROFILE MOTOR

(75) Inventor: Akihito Shirai, Ozu (JP)

(73) Assignee: Panasonic Corporation, Osaka (JP)

( * ) Notice: Subject to any disclaimer, the term of this patent is extended or adjusted under 35 U.S.C. 154(b) by 496 days.

(21) Appl. No.: 10/552,245

(22) PCT Filed: Dec. 26, 2003

(86) PCT No.: PCT/JP03/16878

§ 371 (c)(1),
(2), (4) Date: Oct. 7, 2005

(87) PCT Pub. No.: WO2005/067125

PCT Pub. Date: Jul. 21, 2005

(65) Prior Publication Data

US 2006/0214532 A1    Sep. 28, 2006

(51) Int. Cl.
*H02K 1/06* (2006.01)
(52) U.S. Cl. .................. 310/216.068; 29/596; 29/598; 29/602.1; 29/605; 29/606; 310/67 R; 310/91
(58) Field of Classification Search .................. 29/596, 29/598, 602.1, 605, 606; 310/67 R, 91, 216
See application file for complete search history.

(56) References Cited

FOREIGN PATENT DOCUMENTS

| | | |
|---|---|---|
| GB | 2159078 | * 11/1985 |
| JP | 59-18568 | 2/1984 |
| JP | 60-135042 | 9/1985 |
| JP | 60-156875 | 10/1985 |
| JP | 60-162976 | 10/1985 |
| JP | 61-27482 | 2/1986 |
| JP | 61-88481 | 6/1986 |
| JP | 10-178749 | 6/1998 |
| JP | 2000-350404 | * 12/2000 |
| JP | 2001-349749 | 12/2001 |
| JP | 2003-70219 | 3/2003 |
| JP | 2004-40936 | 2/2004 |

* cited by examiner

*Primary Examiner*—Thiem Phan
(74) *Attorney, Agent, or Firm*—Steptoe & Johnson LLP

(57) ABSTRACT

A low-profile motor includes a rotor yoke having a rotor magnet on its inner or outer surface and being rotationally supported on a motor base via a shaft, and a stator core constituted of a plurality of T-shaped winding parts each having an end opposed to the rotor magnet. On the motor base formed with a hole for supporting the rotor yoke via the shaft, the plurality of T-shaped winding parts are cut like tongues along the radial direction of the hole, and the T-shaped winding parts are each bent such that their ends are opposed to the rotor magnet. Thus, it is possible to readily form the T-shaped winding parts, eliminate the need for mounting the T-shaped winding parts, and reduce the number of parts and steps. This technique enables it to efficiently form an inexpensive low-profile motor for a magnetic disk unit and the like.

2 Claims, 2 Drawing Sheets

LOW PROFILE MOTOR

TECHNICAL FIELD

The present invention relates to a low-profile motor used for a magnetic disk unit and the like and a method of manufacturing the same.

BACKGROUND ART

As shown in FIG. 3, in a conventional low-profile motor used for a magnetic disk unit or the like, a rotator unit A is configured such that a rotor yoke 2 is fixed to a shaft 1 and a rotor magnet 3 are attached to the inner surface of the rotor yoke 2. A bearing unit B is constituted of a radial bearing 4 for supporting the shaft 1 in the radial direction and a thrust bearing 5 for supporting the shaft 1 in the axial direction. The bearing unit B is fit and fixed into a hole 7a of a cylindrical motor mounting part 7 which is formed on a motor base 6, the inner edge of a stator core 8 is bonded and fixed to a step 7b on the outer surface of the motor mounting part 7, and ends 9a of a plurality of T-shaped winding parts 9 of the stator core 8 are opposed to the rotor magnets 3, respectively. With this configuration, by energizing windings 10 on the T-shaped winding parts 9, a magnetic field is generated on the stator core 8, the rotor magnets 3 are excited, and a running torque can be generated on the rotor yoke 2.

As shown in FIG. 4, in the stator core 8, the T-shaped winding parts 9 extend radially from a ring part fit onto the motor mounting part 7 and the arc-shaped ends 9a of the T-shaped winding parts 9 are arranged in the circumferential direction. Conventionally, the stator core 8 is formed of a stack of stator plates. The stacking step and the step of mounting the stator core 8 on the motor mounting part are complicated and time consuming.

The present invention is devised to solve the problem and has as its object the provision of a low-profile motor in which a stator core can be readily formed and mounted.

DISCLOSURE OF THE INVENTION

In order to attain the object, according to the first aspect of the invention, a low-profile motor is provided, which comprises a rotor yoke having a rotor magnet on its inner surface or outer surface and being rotationally supported on a motor base via a shaft, and a stator core constituted of a plurality of winding parts each having an end opposed to the rotor magnet, wherein on the motor base where a hole for supporting the rotor yoke via the shaft is formed, the plurality of winding parts constituting the stator core are cut like tongues along the radial direction of the hole and integrated, and each of the winding parts is bent such that the end of the winding part is opposed to the rotor magnet. Thus, it is possible to readily form the winding parts of the stator core, eliminate the need for mounting the stator core, and reduce the number of parts and steps.

According to the second aspect of the invention, in the low-profile motor configured as mentioned above, the motor base includes the plurality of winding parts is entirely formed of a silicon steel plate. Since the winding parts are integrated with the motor base, the electrical characteristics of the winding parts constituting the stator core is not impaired.

According to the third aspect of the invention, a manufacturing method is provided for a low-profile motor which comprises a rotor yoke having a rotor magnet on its inner surface or outer surface and being rotationally supported on a motor base via a shaft, and a stator core constituted of a plurality of winding parts each having an end opposed to the rotor magnet. The method comprises forming on the motor base a hole for supporting the rotor yoke via the shaft, cutting the plurality of winding parts constituting the stator core to be like tongues along the radial direction of the hole and integrating these winding parts on the motor base, and bending each of the winding parts such that the end of each winding part is opposed to the rotor magnet. Hence, it is possible to simplify the manufacturing process and achieve an inexpensive low-profile motor with high manufacturing efficiency as compared with the conventional method of separately forming and mounting a stator core on a motor base.

According to the fourth aspect of the invention, in the method of manufacturing the low-profile motor mentioned above, the step of cutting the plurality of winding parts on the motor base and the step of bending the winding parts are performed by press processing. It is possible to perform the steps at once, thereby further simplifying the manufacturing process.

BEST MODE FOR CARRYING OUT THE INVENTION

The following will describe embodiments of the present invention in accordance with the accompanying drawings.

Embodiment 1

Figure 1:
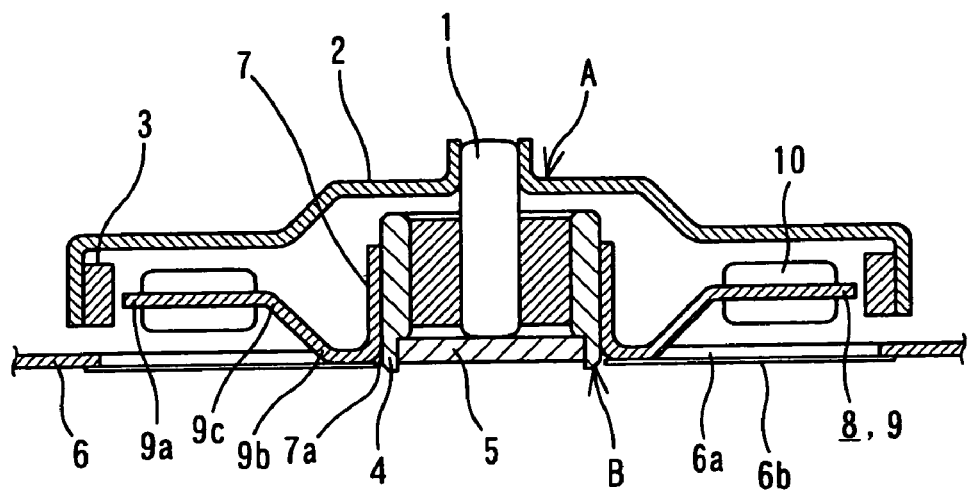
FIG. 1 is a sectional view showing a low-profile motor of outer rotor type according to Embodiment 1 of the present invention.

FIG. 1 is a sectional view showing a low-profile motor according to Embodiment 1 of the present invention. In FIG. 1, members having the same operations as those of the conventional low-profile motor shown in FIG. 3 will be indicated by the same reference numerals as FIG. 3.

Figure 3:
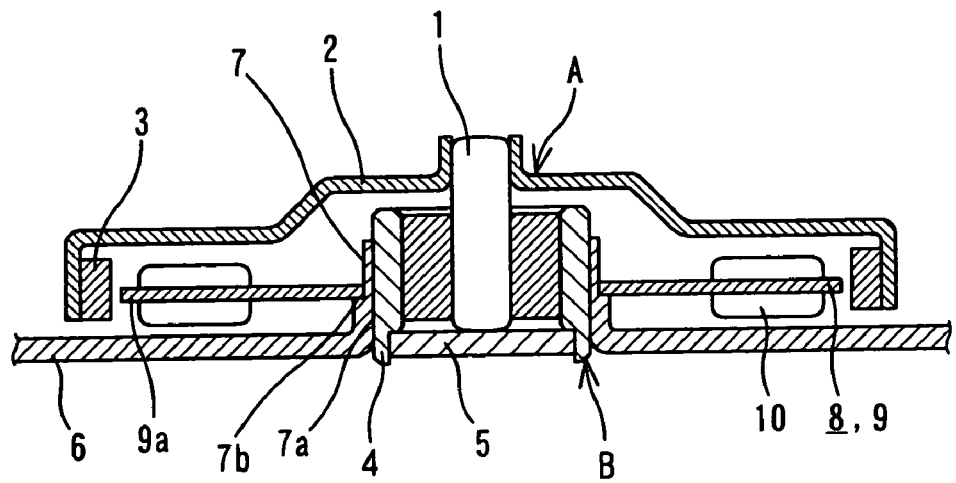
FIG. 3 is a sectional view showing a conventional low-profile motor.
Figure 4:
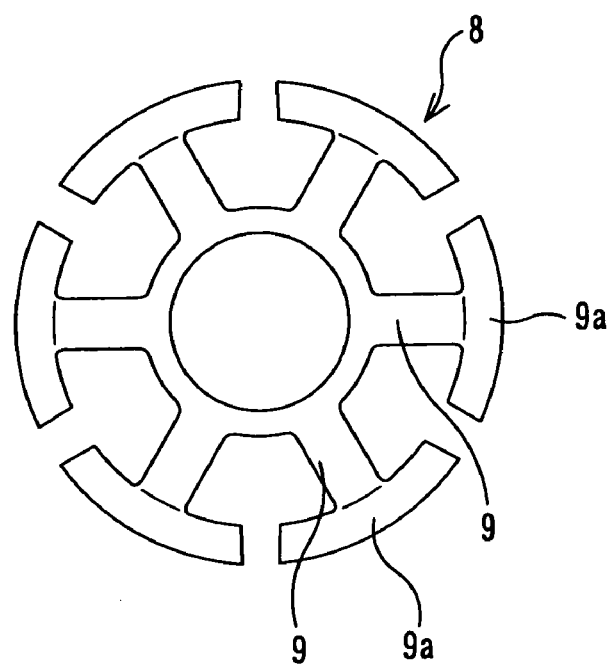
FIG. 4 is plan view showing a conventionally used stator core.

As shown in FIG. 1, the low-profile motor is an outer rotor motor almost identical in configuration to the conventional low-profile motor shown in FIG. 3. A rotator unit A is configured such that a rotor yoke 2 is fixed to a shaft 1 and rotor magnets 3 are attached to the inner surface of the rotor yoke 2. A bearing unit B is constituted of a radial bearing 4 for supporting the shaft 1 in the radial direction and a thrust bearing 5 for supporting the shaft 1 in the axial direction.

The shaft 1 of the rotator unit A is inserted into the bearing unit B which is fit and fixed into a hole 7a of a cylindrical motor mounting part 7 of a motor base 6. In the rotor yoke 2 of the rotator unit A, a stator core 8 constituted of a plurality of T-shaped winding parts 9 is disposed such that arc-shaped ends 9a of the T-shaped winding parts 9 are opposed to the rotor magnets 3. Windings 10 are wound around portions near the ends 9a of the T-shaped winding parts 9.

The low-profile motor is different from the conventional motor in that the plurality of T-shaped winding parts 9 are cut like tongues along the radial direction of the motor mounting part 7 and integrally formed on the motor base 6 where the cylindrical motor mounting part 7 is formed in the above manner, and the T-shaped winding parts 9 are bent like letter L with the ends 9a opposed to the rotor magnets 3. Openings 6a formed by cutting and bending the T-shaped winding parts 9 are filled with filling members 6b.

To be specific, on a flat part of the motor base 6 extending from the lower end of the motor mounting part 7 to the outside, the T-shaped winding parts 9 are cut to the inside along the radial direction of the motor mounting part 7 such that the ends 9a are positioned near the rotor magnets 3, and the T-shaped winding parts 9 are bent diagonally above at bent portions 9b and bent to the outside at bent portions 9c, so that the ends 9a are opposed to the rotor magnets 3. The motor base 6 including the T-shaped winding parts 9 is entirely formed of a silicon steel plate which is used conventionally as a material of the stator core 8.

In the production of the motor base 6, the cylindrical motor mounting part 7 and the plurality of T-shaped winding parts 9 are sequentially formed in the flow of press processing for sheet metal (silicon steel plate). In this flow, the step of cutting the plurality of T-shaped winding parts 9 like tongues and the step of bending the T-shaped winding parts 9 can be performed at once.

Therefore, it is possible to reduce the number of components and steps as compared with the conventional method of separately forming and mounting the stator core 8 on the motor base 6. Since the steps of the stator core make up a large proportion of the overall cost of the motor, the cost can be considerably reduced.

As described above, the motor base 6 including the T-shaped winding parts 9 is formed of a silicon steel plate, and thus the electrical characteristics of the T-shaped winding parts 9 constituting the stator core 8 is not impaired.

Current low-profile motors have a limitation of storage up to about two stator plates having a thickness of 0.2 mm in a 1-inch HDD and so on. The low-profile motors can be further reduced in size and thickness unlike the conventional art in which a stator core is formed of a stack of stator plates. In this case, the specification of windings is changed from that of a laminated stator core, so that the same characteristic as the laminated stator core can be obtained.

Embodiment 2

Figure 2:
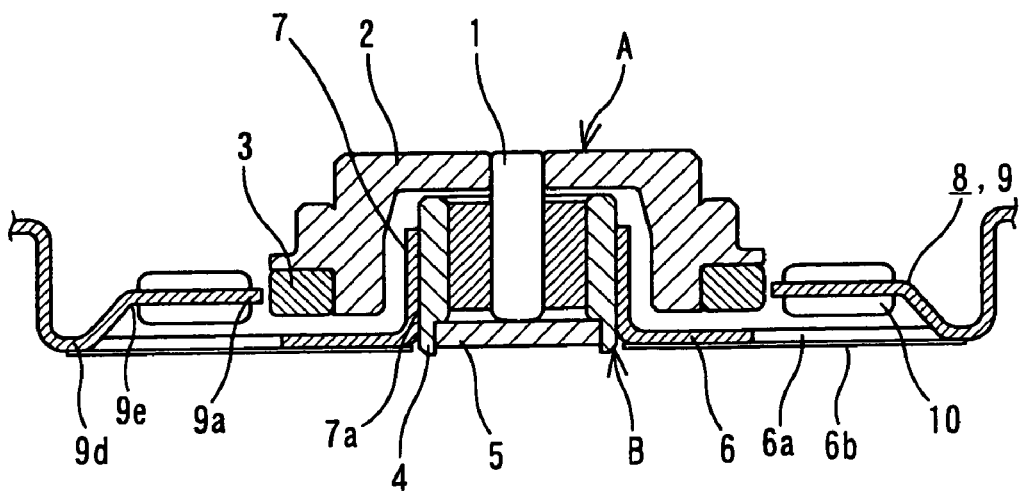
FIG. 2 is a sectional view showing a low-profile motor of inner rotor type according to Embodiment 2 of the present invention.

FIG. 2 is a sectional view showing a low-profile motor according to Embodiment 2 of the present invention. The low-profile motor is an inner rotor motor having the same configuration as the above-described low-profile motor. In the configuration of the low-profile motor, T-shaped winding parts 9 are cut to the outside along the radial direction of a motor mounting part 7 on a flat part of a motor base 6 such that ends 9a of the T-shaped winding parts 9 are positioned near rotor magnets 3, and each of the T-shaped winding parts 9 is bent diagonally above at a bent portion 9d and bent to the inside at a bent portion 9e.

The shape of the motor mounting part 7 is not limited to a cylinder as long as the motor mounting part 7 has a hole 7a where a bearing unit B can be fit and fixed. In addition to the press processing, a method such as metal injection is available to form the motor base 6.

As described above, in the low-profile motor of the present invention, a plurality of winding parts constituting a stator are cut and integrally formed on a motor base, and the winding parts are bent such that the ends of the winding parts are opposed to rotor magnets. Thus, it is possible to achieve a small thickness, high manufacturing efficiency, and low cost as compared with the conventional art.

The invention claimed is:

1. A low-profile motor, comprising:
   a motor base comprising a steel plate having a cylindrical motor mounting part and a stator core, such that the motor base, the cylindrical motor mounting part, and the stator core are integrally part of said steel plate, the motor base extending radially outward from the cylindrical motor mounting part past an outer edge of the stator core;
   a bearing located within said cylindrical motor mounting part;
   a rotator unit, comprising a rotor yoke attached to a shaft, said shaft rotationally supported by said bearing; and
   at least one rotor magnet attached to said rotor yoke;
   wherein the stator core comprises a plurality of winding parts that are integral with said motor base, the winding parts comprising portions of the steel plate defined by cuts in the motor base and still connected to the motor base at one end,
   the plurality of winding parts comprise tongues extending in a radial direction towards or away from said cylindrical motor mounting part, and
   the plurality of winding parts having radially extending ends not connected to said motor base, and opposite the rotor magnets.

2. The low-profile motor according to claim 1, wherein the motor base is a single silicon steel plate.

* * * * *